April 8, 1930.  O. GERHARDT  1,753,885
RADIATION APPARATUS
Filed June 7, 1927   5 Sheets-Sheet 1

Inventor:
Oscar Gerhardt
by
Franz Reinhold
Attorney.

Inventor:
Oscar Gerhardt
by Franz Neinhold
Attorney.

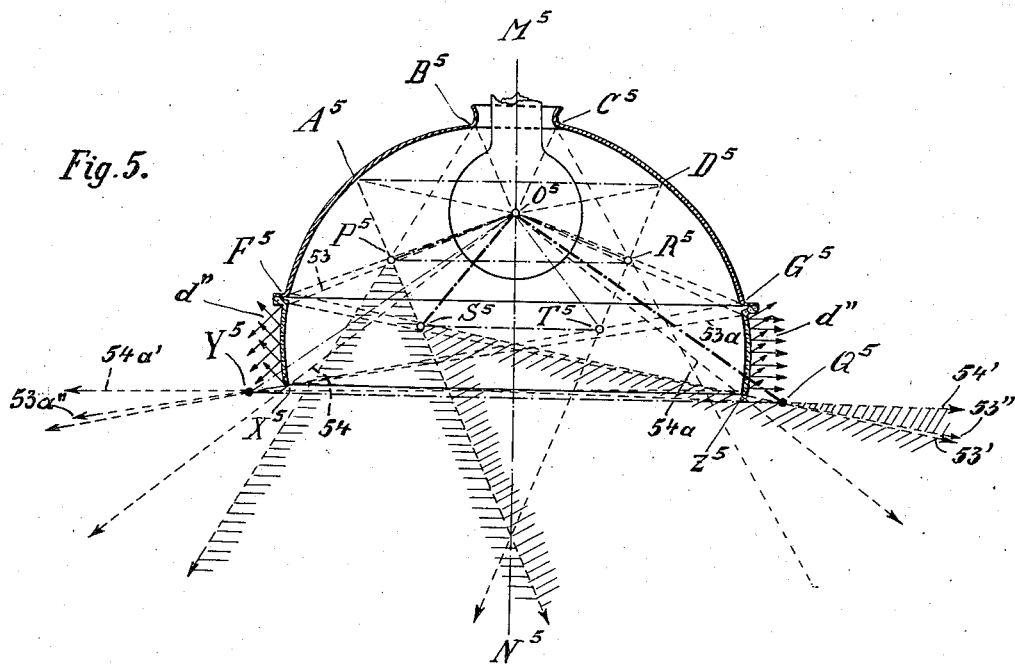
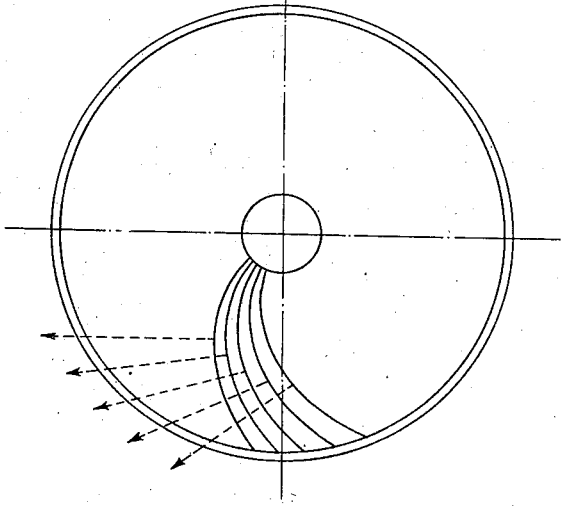

April 8, 1930.                O. GERHARDT                1,753,885
                         RADIATION APPARATUS
                        Filed June 7, 1927         5 Sheets-Sheet 4
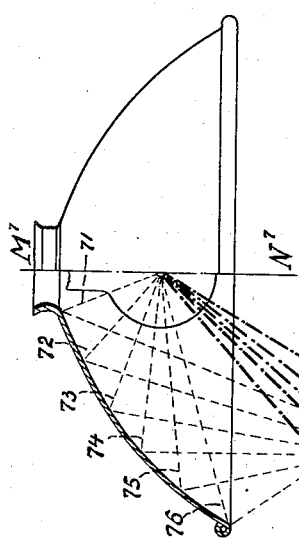
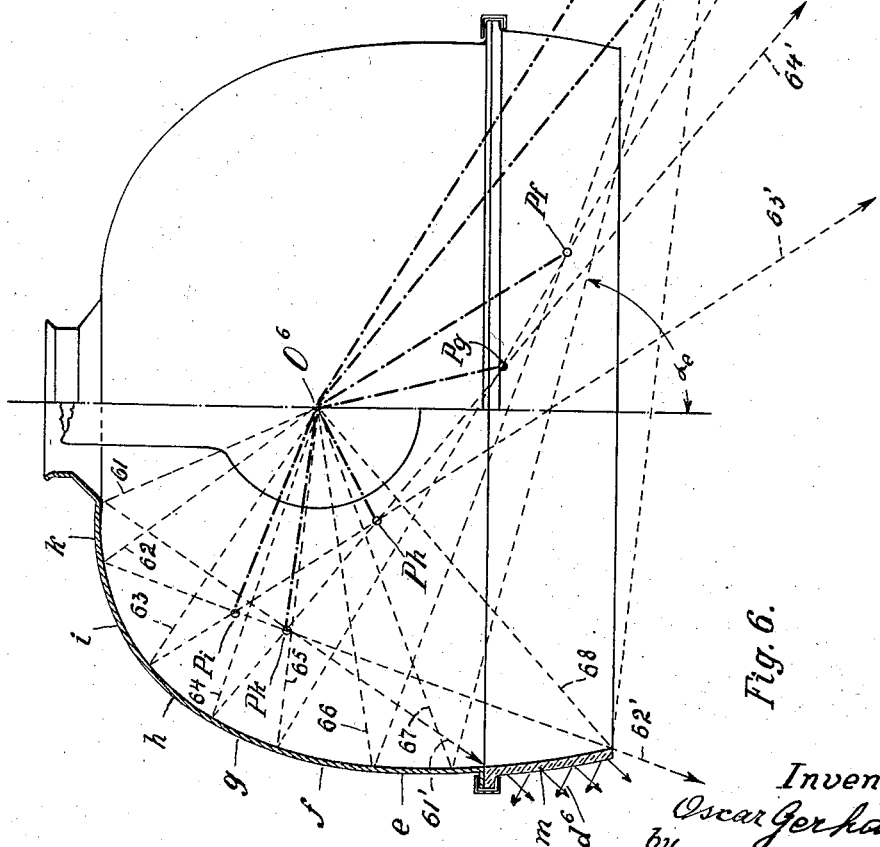

April 8, 1930.                    O. GERHARDT                    1,753,885
                              RADIATION APPARATUS
                              Filed June 7, 1927            5 Sheets-Sheet 5

Inventor:
Oscar Gerhardt
by
Franz Reinhold
Attorney.

Patented Apr. 8, 1930

1,753,885

UNITED STATES PATENT OFFICE

OSCAR GERHARDT, OF BERLIN-LICHTERFELDE-OST, GERMANY

RADIATION APPARATUS

Application filed June 7, 1927, Serial No. 197,204, and in Germany June 14, 1926.

My invention relates to improvements in radiation apparatus, and more particularly in apparatus of the class in which the rays emanating from a source thereof are collected by a reflector and reflected thereby to the surface or room to be illuminated. One of the objects of the improvements is to provide an apparatus in which none of the reflected rays passes through the source of light or lamp, and in which this result is obtained by only once reflecting the said rays. With this object in view my invention consists in composing the reflector of a surface of revolution generated by a plurality of sectional ellipses each having one of its foci located outside the axis of revolution, the said foci being located so that the rays reflected by the reflector do not intersect the source of light. Other objects of the improvements will appear from the following description.

For the purpose of explaining the invention several examples embodying the same have been shown in the accompanying drawings, in which the same letters of reference have been used in all the views to indicate corresponding parts. In said drawings—

Fig. 5 is a sectional elevation showing a modification similar to the one illustrated in Fig. 1 and provided, in addition, with an elliptical surface made from translucent material and adapted to reflect a portion of the light and to permit the passage of the remaining portion therethrough;

Fig. 6, shows a modification similar to the one illustrated in Fig. 5, in which however the surface of revolution is generated by a large number of sectional ellipses, the foci of the said ellipses being disposed so that the reflected rays cover a broad field;

Fig. 7, is a sectional elevation showing a modification in which the reflector is likewise generated by sectional ellipses the foci of which are located so that the light is reflected substantially in the direction of the axis of the reflector;

Fig. 10, is a bottom view of a reflector showing the dim polish made by spiral strokes.

In all the examples shown in the figures the radiation apparatus comprises a source of light $s$ such for example as an incandescent lamp, and a reflector in the form of a surface of revolution, the said parts being mounted in any known or preferred way. The manner of mounting the said parts does not form a part of my invention, and I deem it not necessary to show the same in the figures.

Figure 1:
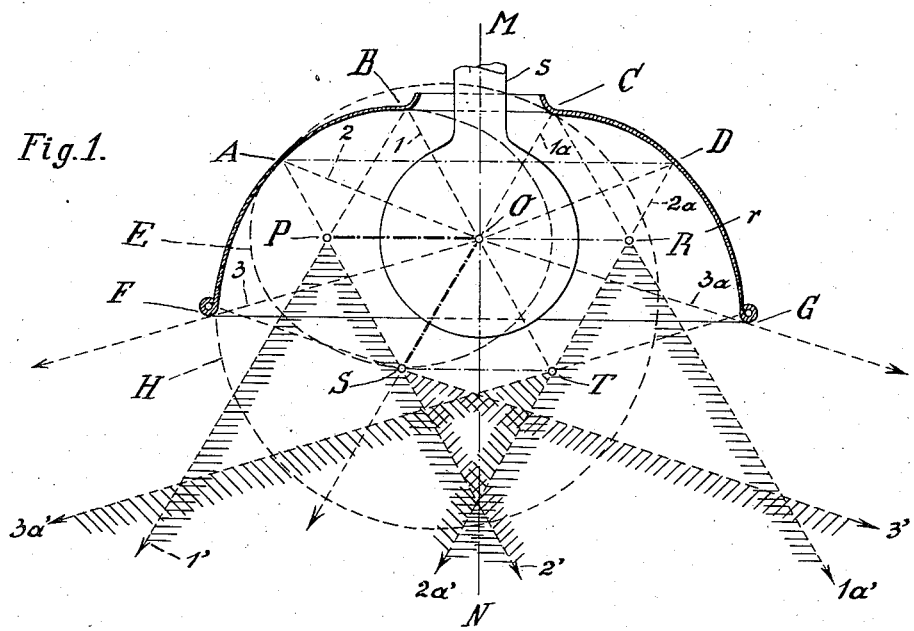
Fig. 1, is a sectional elevation showing a radiation apparatus in which the reflector is generated by two sectional ellipses the foci of which are located so that a part of the light is reflected in lateral direction.

In the example shown in Fig. 1 the surface of revolution forming the reflector comprises two sections A—B, C—D and A—F, D—G. The portion A—B, C—D of the surface of revolution is generated by means of a sectional ellipse A—B forming a part of an ellipse E shown in Fig. 1 in dotted lines, the said ellipse having a focus O located on the axis of revolution M—N, and an outer focus P located outside the said axis of revolution. In the example shown in Fig. 1, the line O—P is horizontal, and the focus O of the ellipse E coincides with the centre of the source of light. But I wish it to be understood that my invention is not limited to these features. By the revolution of the ellipse E the focus P describes a circle, the diameter of which is P—R, and on the said circle the foci of all the ellipses are located which are described by the revolving curve A—B. The section A—F, D—G of the reflector is produced by revolution of the section A—F of an ellipse H having the foci O and S, and the foci of all the ellipses described by the revolution of the section A—F are located on a circle the diameter of which is S—T. If the illuminating body of the lamp $s$ coincides with the focus O of the ellipses E and H, the rays emanating from O and impinging upon the upper section A—B, C—D of the reflector pass through the corresponding foci located on the circle passing through the points P and R. In Fig. 1, I have shown the end rays 1 and 2, and the figure shows that the said end rays and all the rays included between the same are reflected without passing through the globe of the lamp $s$. The rays passing through the said circle are emitted into the room to be illuminated in the form of a body of revolution the outer rays of which are the rays 1', 2' and 1a', 2a'. In Fig. 1 the said rays have been indicated by horizontal hatching.

The rays 2 and 3 emanating from the source of light O and impinging upon the section A—F, D—G pass through the foci located on the circular line S—T, and they are emitted from the points of the circle S—T in the form of a body of revolution generated by the revolution of the area included between the outer rays 2' and 3' and 2a' and 3a', the said area being indicated in Fig. 1 by inclined hatching. Thus the rays emanating from the circles P—R and S—T intersect each other.

The foci P and S of the ellipses A—B and A—F and the point A in which the said ellipses merge into each other are located on a straight line A—S. Considering now pencils of rays reflected by the ellipses A—B and A—F, it will be found that the fields illuminated by the said ellipses and indicated in Fig. 1 by the cross-hatched fields included between the rays 1'—2' and 2'—3' are located directly one beside the other. Thus, the field included between the rays 1'—2' is illuminated exclusively by the section A—B of the reflector, and it does not receive light from the section A—F, and the field included between the rays 2'—3' is illuminated exclusively by the rays emanating from the ellipse A—F, and it does not receive light from the section A—B.

By varying the form of the ellipses E and H, and the angular position of the axes O—P and O—S relatively to the axis of rotation M—N, the illumination by the source of light can be varied in large limits, and it can be determined by calculation.

Figure 2:
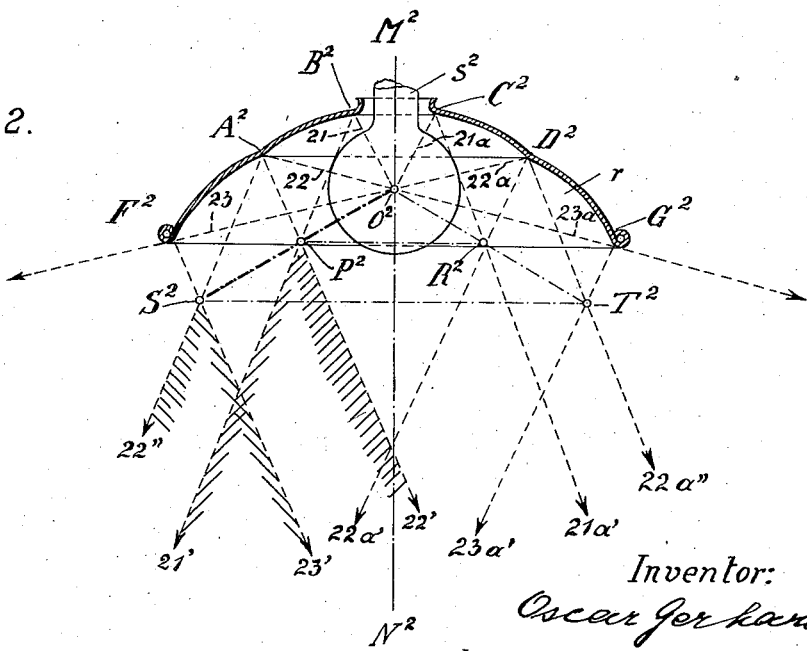
Fig. 2, is a similar sectional elevation showing a modification in which the rays are reflected substantially in the direction of the axis of rotation.

In Fig. 2 I have shown a modification in which the said values of the ellipses have been varied. While in the construction shown in Fig. 1 the foci, and more particularly the focus S, are located so that a part of the rays is reflected in lateral direction, Fig. 2 shows a modification in which the foci are located so as to reflect the light substantially in the direction of the axis $M^2$—$N^2$, or more correctly through a cone having a comparatively small angle at its apex. As shown in the said figure, one of the foci $O^2$ of each ellipse is again located on the axis of revolution $M^2$—$N^2$, and it coincides with the centre of the source of light $s^2$. The focus $P^2$ of the ellipse the arc $A^2$—$B^2$ of which generates the upper section of the reflector is located farther away from the said reflector, the line $O^2$—$P^2$ being inclined downwardly and away from the horizontal line passing through the focus $O^2$. Therefore, the rays 21, 22, 21', 22' and 21a, 22a, 21a', 22a' reflected by the section $A^2$—$B^2$, $C^2$—$D^2$ and intersecting the circle $P^2$—$R^2$ include an angle which is smaller than that included between the rays intersecting the circle P—R. Further, the focus $S^2$ of the ellipse the arc $A^2$—$F^2$ of which generates the lower section of the reflector is farther away from the axis of revolution $M^2$—$N^2$ than the focus S, and as shown the foci $O^2$, $P^2$ and $S^2$ are located on a straight line. Therefore, the rays 22, 23, 22', 23' and 22a, 23a, 22a', 23a' reflected by the section $A^2$—$F^2$, $D^2$—$G^2$ and intersecting the circle $S^2$—$T^2$ generated by revolution of the focus $S^2$ are directed downwardly, as distinguished from the rays emanating from the foci located on the circular line S—T.

The lines $P^2$—$B^2$, $S^2$—$A^2$ and $P^2$—$A^2$, $S^2$—$F^2$ connecting the foci $P^2$ and $S^2$ with the ends of the ellipses $A^2$—$B^2$ and $A^2$—$F^2$ are respectively parallel to each other. Therefore, the rays 22', 23' and 21', 22'' emanating from the foci $P^2$ and $S^2$ and including the cones of rays emanating from the said foci are likewise respectively parallel to each other.

Figure 3:
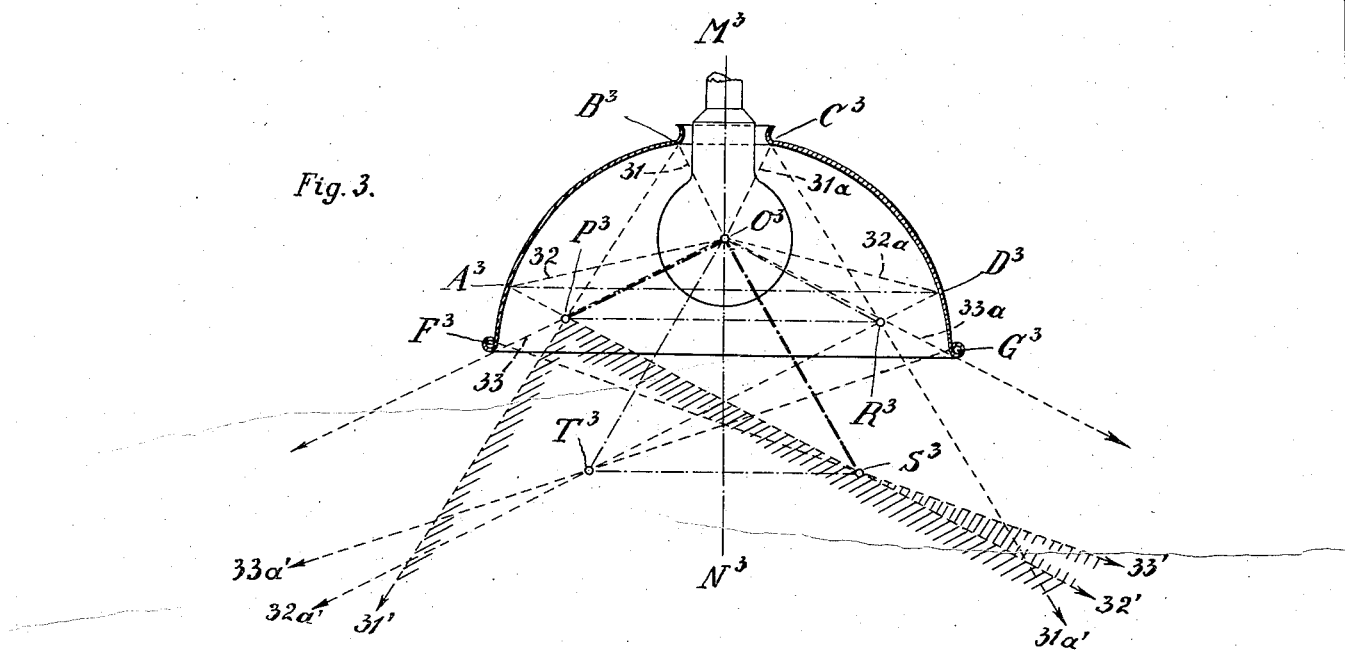
Fig. 3, is a sectional elevation showing a modification which is likewise designed for lateral illumination, in which, however, the field covered by the reflected rays is larger than in case of the reflector shown in Fig. 1.

In Fig. 3, I have shown a modification which is particularly designed for illuminating wide spaces. The ellipse the arc $A^3$—$B^3$ of which generates the top part of the reflector has its axis $O^3$—$P^3$ inclined downwardly from the horizontal line passing through the focus $O^3$. Thus, the rays 31, 32 and 31a, 32a reflected from the section $A^3$—$B^3$, $C^3$—$D^3$ and intersecting the circle $P^3$—$R^3$ of the outer focus $P^3$ are included between the rays 31', 32' and 31a', 32a'. The outer focus $S^3$ of the ellipse the arc $A^3$—$F^3$ of which generates the lower section of the reflector is located at the side of the axis $M^3$—$N^3$ opposite to the focus $P^3$, and the rays 32, 33 and 32a, 33a reflected by the section $A^3$—$F^3$, $D^3$—$G^3$ and intersecting the circle $S^3$—$T^3$ are included between the rays 33', 32' and 32a', 33a'. When comparing Figs. 1 and 3, it will be seen that in Fig. 1 a part of the rays passing through the focus S overlaps the rays passing through the focus R, while in Fig. 3 all the rays passing through the focus $S^3$ are located outside the cone of rays passing through the focus $P^3$.

By disposing the foci $P^3$ and $S^3$ on opposite sides of the axis of the reflector the distance of the focus $S^3$ from its ellipse $A^3$—$F^3$ is considerably increased as compared to the distance of the focus $P^3$ from its arc $A^3$—$B^3$, so that the rays emanating from the focus $S^3$ are made more convergent than the rays emanating from the focus $P^3$ and reflected by a part of the ellipse $A^3$—$B^3$ which is equal in length to the ellipse $A^3$—$F^3$. Therefore the difference of the light intensity caused by the greater length of the rays emanating from the focus $S^3$ as compared to the length of the rays emanating from the focus $P^3$ is compensated more or less, and the fields are uniformly illuminated by the said rays.

Figure 4:
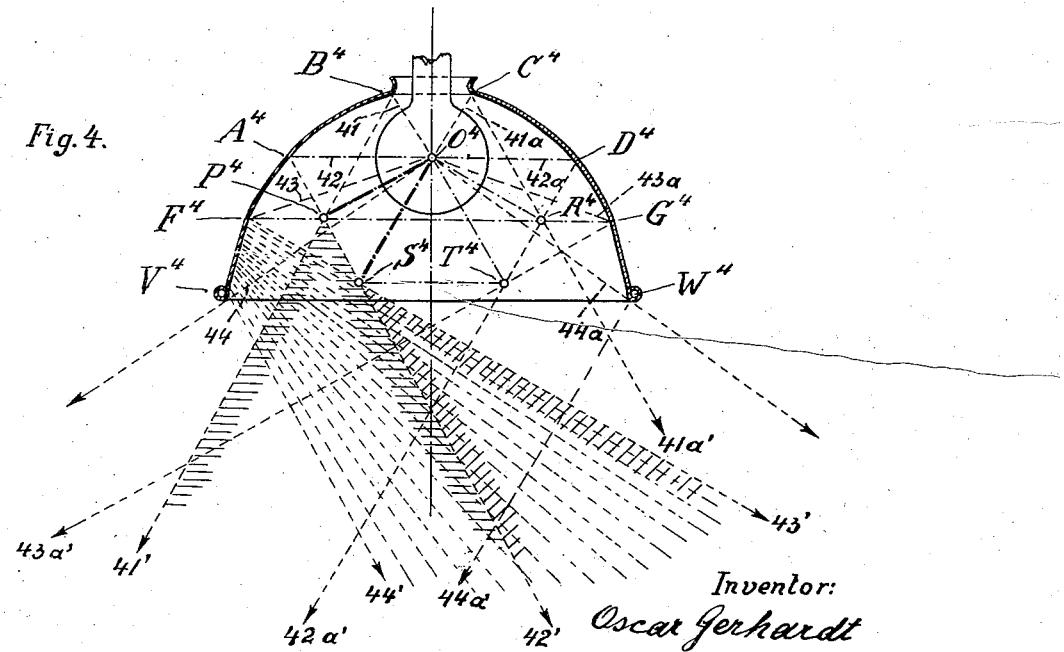
Fig. 4, is a sectional elevation showing a modification similar to the one illustrated in Fig. 1 and provided, in addition to the elliptical surfaces, with a conical surface.

The modification shown in Fig. 4 is similar to the one illustrated in Fig. 1, but the focus $P^4$ of the ellipse providing the upper section $A^4$—$B^4$, $C^4$—$D^4$, is located below the horizontal line passing through the focus $O^4$. In addition to the elliptical portion of the reflector a conical portion $F^4$—$V^4$, $G^4$—$W^4$ is provided, and the rays reflected by the said conical portion overlap the cones emanating from the circles of the foci $P^4$ and $S^4$. Thus, the illumination by the radiating apparatus is composed as follows: The rays 41, 42 and 41a, 42a reflected by the portion $A^4$—$B^4$, $C^4$—$D^4$ of the reflector pass through the focus $P^4$, $R^4$, and they are included between the rays 41', 42', 41a', 42a', the rays 42, 43 and 42a, 43a reflected by the second elliptical portion $A^4$—$F^4$, $D^4$—$G^4$ pass through the circles of the foci $S^4$, $T^4$, and they are included between the rays 42', 43' and 42a', 43a', and the rays 43 and 44 impinging upon the conical portion $F^4$—$V^4$, $G^4$—$W^4$ are reflected and included between the rays 43', 44' and 43a', 44a'.

In Fig. 4 the bottom part of the reflector is conical in form, and it will be understood that the lines $F^4$—$V^4$ and $G^4$—$W^4$ may be inclined more or less, and that they may even be parallel to the axis $M^4$—$N^4$ so as to generate a cylindrical sectional reflector. Further, I may use a third elliptical or a parabolic line in lieu of the straight line $F^4$—$V^4$ for forming the bottom part of the reflector. If the said portion is generated by an ellipse having one of its foci coinciding with the focus $O^4$, the reflected rays are converging, and if it is formed by a parabola the focus of which coincides with the focus $O^4$, the rays are parallel to the axis $M^4$—$N^4$.

In Fig. 5 I have shown a modification in which the elliptical portions $A^5$—$B^5$, $C^5$—$D^5$ and $A^5$—$F^5$, $D^5$—$G^5$ are similar to the elliptical portions shown in Fig. 4, and similar reference characters have been used to indicate corresponding parts. The bottom part $F^5$—$X^5$, $G^5$—$Z^5$ of the reflector consists of a bowl of glass formed by an arc of an ellipse one focus of which coincides with the focus $O^5$ of the elliptical sections $A^5$—$B^5$, $C^5$—$D^5$ and $A^5$—$F^5$, $D^5$—$G^5$, while the outer focus $Q^5$ is located at the side of the axis $M^5$—$N^5$ opposite to the foci $P^5$—$Y^5$. The outer surface of the said bowl of glass is dimmed, so that the bowl permits the passage of diffuse light indicated in the figure by the rays $d''$. A portion of the light impinging upon the said bowl is reflected, the rays 53 and 54 impinging upon the left hand part of the bowl passing through the focus $Q^5$ and being emitted therefrom into the room between the rays 53'' and 54'. In a similar way the rays 53a and 54a reflected by the right hand part of the said bowl pass through the focus $Y^5$, as has been indicated by the rays 53a'' and 54a'.

In lieu of the dimmed bowl of glass a glass bowl having catoptric and dioptric action can be used.

In the foregoing I have described reflectors composed of two or three elliptical surfaces, and I have shown that by varying the form of the ellipses and the position of the foci various illuminating effects can be obtained. In Figs. 6 and 7 I have shown modifications in which the reflectors are composed of a large number of different ellipses having their foci located so that the distribution of the light is further varied.

The example shown in Fig. 6 is designed for illuminating wide spaces. The reflector is generated by elliptical arcs $e, f, g, h, i$ and $k$ having one of their foci located at $O^6$, and having their outer foci located at $Pe$, $Pf$, $Pg$, $Ph$, $Pi$ and $Pk$. In addition a glass bowl $m$ is provided at the bottom part of the reflector which is formed by an arc of an ellipse having one focus at $O^6$ and the other focus at $Pm$, the said bowl emitting diffuse light rays $d^6$ and reflecting the remaining part of the light. The rays impinging upon the sections of the reflector and reflected thereby have received the characters 61 to 68, and 61' to 68'. The greater the distance between an outer focus and the corresponding elliptical curve, the smaller is the angle included between the rays emanating from the said focus. The ratio of the distance between a reflecting elliptical arc such as $i$ and the inner focus $O^6$, and the distance between the outer focus ($Pi$) and the said arc determines the ratio of the light intensity impinging upon the said arc such as $i$ and the light intensity emanating from the corresponding second focus such as $Pi$. For example, the drawing shows that the angle included between the rays 66' and 67' emanating from the focus $Pe$ is about one half the angle included between the rays 66 and 67 impinging upon the section $e$ of the reflector. Therefore, the intensity of the light included between the rays 66' and 67' is the double of the intensity of the non-reflected light of the lamp between the rays 66 and 67.

Thus, by varying the distance of the outer focus from the portion of the reflector corresponding thereto, a larger or smaller portion of the light emanating from the lamp can be reflected into a desired direction and through a larger or smaller angle, and I am enabled, by properly disposing the foci, to produce a reflector which is capable of uniformly illuminating large spaces. In order to avoid blinding by means of the reflector, the dimmed glass bowl $m$ is provided, which emanates only diffuse light to the outside, and which screens the source of light, while the inner face of the said bowl reflects a portion of the light impinging thereon at a very small angle to the horizontal. In the example shown in the figure the portion of the light impinging upon the uppermost section $k$ of the reflector is thrown through the focus $Pk$ and on the glass bowl $m$, in order to increase the intensity of the light passing through the said bowl. If the ratio of the length of the rays emanating from $O^6$ and impinging upon the reflector, and the length of the rays reflected by the reflector and intersecting the outer focus, that is the distance between the outer focus and the reflecting surface, is always nearly equal to the third power of the cosine of the angle $(\alpha_c)$ included between the rays $(67')$ emanating from the outer focus and the axis of revolution, an illuminating apparatus is obtained by means of which the ground is uniformly illuminated.

In Fig. 7 I have shown a modification, in which the light is reflected substantially in the direction of the axis $M^7$—$N^7$. The outer foci are located relatively to one another so that the foci of the outer elliptical arcs are nearer the said arcs than the foci of the inner elliptical arcs. Thereby the light rays 71 to 76 are reflected into the directions $71'$ to $76'$ which include comparatively small angles with the axis $M^7$—$N^7$. Of course, the position of the outer foci can be disposed so that certain sections receive more intense illumination than other sections.

In the foregoing I have described radiation apparatus having a single source of light, the centre of the said source coinciding with one of the foci of each ellipse. Where more than one source of light are provided the centres of the said lamps must likewise coincide with one of the foci of the ellipses.

Figures 8, 9:
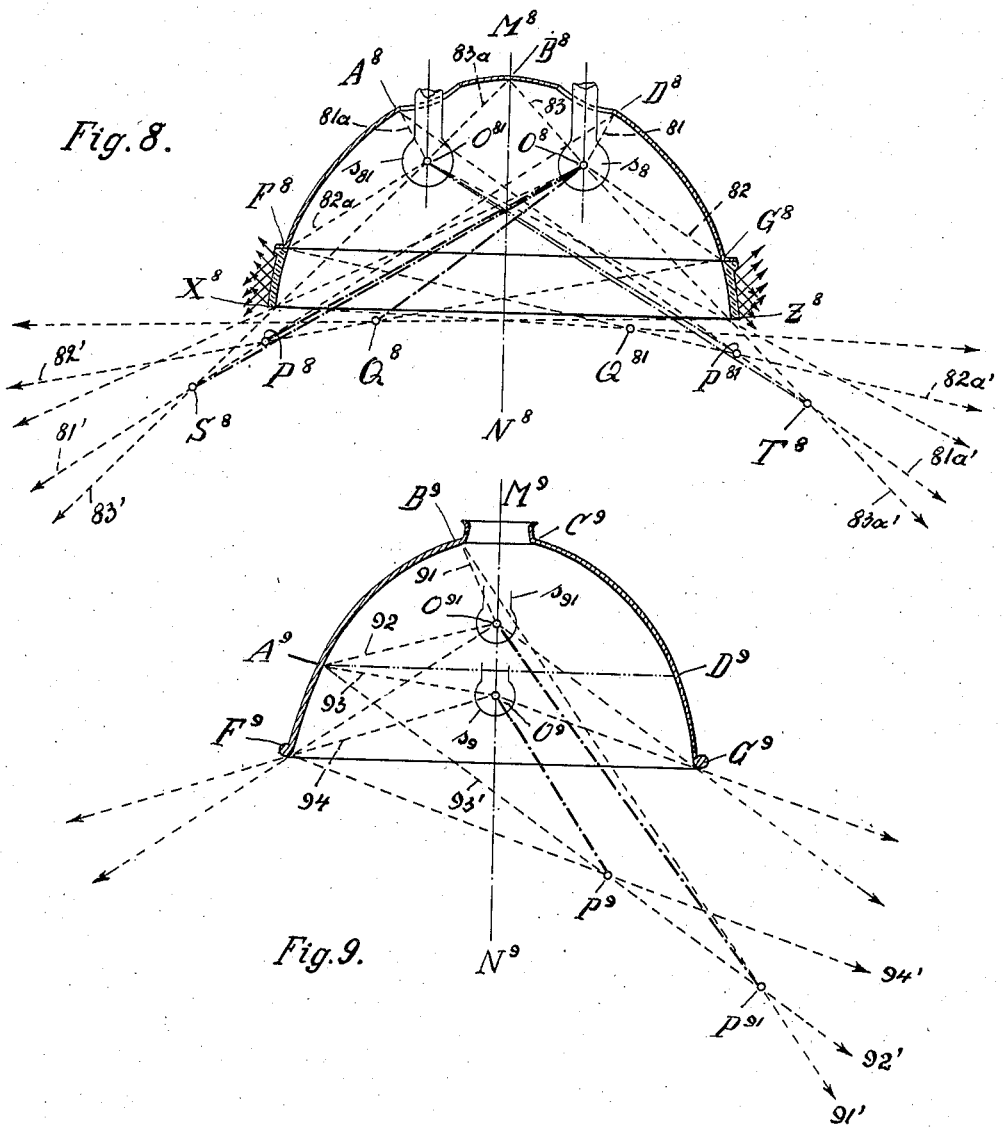
Figs. 8 and 9, are sectional elevations showing apparatus comprising two sources of light.

In Fig. 8 I have shown an example in which two lamps $s_8$ and $s_{81}$ are disposed one beside the other and on opposite sides of the axis of revolution. The reflector consists of three sections $A^8$—$B^8$—$D^8$, $A^8$—$F^8$—$D^8$—$G^8$, and $F^8$—$X^8$—$G^8$—$Z^8$, the last-named section being made from partly reflecting transparent glass. The section $A^8$—$F^8$—$D^8$—$G^8$ is generated by revolution of the arc $D^8$—$G^8$ of an ellipse the foci of which are $O^8$ and $P^8$, both foci being located outside the axis of revolution $M^8$—$N^8$. By revolution of the said ellipse the foci describe circles which include the foci $O^{81}$ and $P^{81}$. The section $A^8$—$B^8$—$D^8$ of the reflector is generated by revolution of the arc $B^8$—$D^8$ of an ellipse the foci of which are $O^8$ and $S^8$, the said foci describing circles including the foci $O^{81}$ and $T^8$. The section $F^8$—$X^8$—$G^8$—$Z^8$ is generated by revolution of the arc $G^8$—$Z^8$ of an ellipse the foci of which are $O^8$ and $Q^8$, and the said foci describe circles including the foci $O^{81}$ and $Q^{81}$.

The rays emanating from the source $s_8$ and impinging on the arc $D^8$—$G^8$ are included between the rays 81 and 82, and the reflected rays $81'$ and $82'$ pass through the focus $P^8$. In a similar way the rays $81a$ and $82a$ emanating from the lamp $O^{81}$ are reflected by the arc $A^8$—$F^8$, and the reflected rays $81a'$ and $82a'$ pass through the focus $P^{81}$. Rays 81 and 83 emanating from the lamp $O^8$ and impinging upon the arc $D^8$—$B^8$ pass through the focus $S^8$, the reflected rays being $81''$ and $83'$. Rays $81a$ and $84a$ emanating from the lamp $s_{81}$ and impinging upon the arc $A^8$—$B^8$ pass through the focus $T^8$, the reflected rays being $81a''$ and $84a'$. A part of the light impinging on the section $F^8$—$X^8$—$G^8$—$Z^8$ passes through the said section in diffuse form. The remaining part of the rays passes through the foci $Q^{81}$ and $Q^8$.

In the modification shown in Fig. 9 the lamps $s_9$ and $s_{91}$ are disposed one above the other and on the axis of revolution $M^9$—$N^9$. The arc $A^9$—$B^9$ generating the upper section $A^9$—$B^9$—$C^9$—$D^9$ of the reflector is a part of an ellipse the foci of which are $O^{91}$ and $P^{91}$. The arc $A^9$—$F^9$ generating the section $A^9$—$F^9$—$D^9$—$G^9$ is a part of an ellipse the foci of which are $O^9$ and $P^9$. The rays impinging upon the said arcs and reflected thereby have received the characters 91, 92, $91'$, $92'$ and 93, 94, $93'$, $94'$. Similar rays are reflected from the opposite arcs $C^9$—$D^9$ and $D^9$—$G^9$.

In radiation apparatus in which the reflectors have bright reflecting surfaces, and which are provided with more than one lamp it is not possible to prevent a portion of the reflected rays from impinging upon the globe of the lamp. However, I have found that by providing the reflector with a dim polish, and more particularly when dimly polishing the same so as to produce minute parallel strokes on the reflecting surface, the rays are not reflected in radial planes, but they are deflected laterally of the said planes and into direction for passing laterally of the lamp.

The best results are obtained when polishing the reflecting surface so that the fine strokes are disposed spirally on the reflecting surface, as is shown in Fig. 10. In this case the rays of the source of light are reflected in lateral direction, the said direction being perpendicular to the direction of the strokes. Thus most of the rays emanate from the reflector tangentially of circular lines disposed concentrically of the axis of the reflector. If now a source of light is used which is entirely or partly impermeable to light rays, such for example as the incandescent body of incandescent gas lamps, or the carbons of arc lamps, or the metallic fitting of electric incandescent lamps, by reason of the lateral deflection by the spiral strokes the light rays pass laterally of the source of light, so that they cannot be absorbed by the impermeable portions of the lamp.

While the method of thus polishing the reflector is particularly useful in radiation apparatus of the type referred to above, I wish it to be understood that I do not limit myself to the use of the method in such apparatus and that reflectors of this type have universal utility and have important properties also in such lamps in which reflectors of ordinary configuration are provided in lieu of the double elliptical form of the reflectors described above. For example, the objectionable properties of highly polished reflectors, viz, the production of an enlarged image of the source of light on the illuminated surfaces and other objectionable reflexes, are avoided, the dim polish of the reflector preventing the formation of such images by reflecting a uniform diffuse light.

Now, reflectors made from silver, nickel, aluminum, or German silver such as are now in use, are not satisfactory in use when having a dim polish of the form referred to, because such materials are readily spoilt by atmospheric influences. Therefore I manufacture my reflectors from steel having a large content of chromium, such as stainless steel. A reflector of this kind resists atmospheric influences, and when made dirty with soot and other impurities, it can readily be cleaned without being spoilt.

In the practical use I have discovered another important property of reflectors made from stainless steel. The aforesaid reflectors made from silver, nickel, aluminum, and German silver reflect light which contains a comparatively large proportion of blue rays. Now, with the same intensity of light those rays appear most bright the color of which is best adapted to the color sensitiveness of the human eye. Therefore the yellow tints of the light are the most favorable as far as luminosity is concerned. I have found that this condition is answered by reflectors made from the said steel having a high content of chromium, and more particularly stainless steel. In such reflectors the chromium has the function of causing reflection of a comparatively large proportion of the yellow-green part of the spectrum, so that the reflected light is adapted to the color sensitiveness of the eye. Thus the luminous effect of the rays reflected by a reflector made from stainless steel is higher than that of the rays reflected by reflectors made from other metals.

By providing only a portion of the reflecting surface with the said spiral polish, the remaining portion having a high polish, I am enabled to cause the rays to be reflected in part within radial planes, and in part angularly of the said planes. In apparatus provided with two or more sources of light the spiral polish can be made so as to reflect the rays emanating from one source past the other sources of light.

I claim:

1. A radiation apparatus, comprising a source of light, and a reflector having a dim polish in the form of minute strokes radiant from the axis of the reflector.

2. A radiation apparatus, comprising a source of light, and a reflector having a dim polish in the form of minute strokes radiating spirally with respect to the axis of the reflector.

3. A radiation apparatus, comprising a source of light, and a reflector made from stainless steel having a dim polish on its reflecting surface in the form of minute strokes radiating spirally with respect to the axis of the reflector.

4. A radiation apparatus, comprising a source of light, and a reflector in the form of a body of revolution and comprising a plurality of portions produced by contacting arcs of ellipses having one of their foci located on the axis of revolution and the other away from the said axis, the axes of the said ellipses being disposed angularly of one another, and the foci of adjacent ellipses located away from the axis and the point where the said adjacent ellipses merge into each other being located on a straight line.

5. A radiation apparatus, comprising a source of light, and a reflector in the form of a body of revolution and comprising a plurality of portions produced by arcs of ellipses having one of their foci located on the axis of revolution and the other away from the said axis, the arc located near the vertex of the reflector and its focus located away from the axis of revolution being situated at the same side of the said axis of revolution, and the arc remote from the said vertex and its focus located away from the axis of revolution being situated respectively at opposite sides of the said axis of revolution.

6. A radiation apparatus, comprising a source of light, and a reflector in the form of a body of revolution and comprising a plurality of portions produced by arcs of ellipses having one of their foci located on the axis of revolution and the other away from the said axis and separate from one another, the foci of the ellipses of adjacent arcs being disposed in one general direction one behind the other, the foci of the successive arcs beginning from the axis and ending at the outer circumference of the reflector having increasing distances from their respective arcs.

In testimony whereof I hereunto affix my signature.

OSCAR GERHARDT.